United States Patent [19]
Minamino et al.

[11] Patent Number: 5,796,921
[45] Date of Patent: Aug. 18, 1998

[54] MAPPING DETERMINATION METHODS AND DATA DISCRIMINATION METHODS USING THE SAME

[75] Inventors: Katsuki Minamino, Tokyo; Masao Watari, Ibaragi; Miyuki Tanaka, Tokyo; Kazuo Ishii; Yasuhiko Kato, both of Kanagawa; Hiroaki Ogawa, Tokyo; Masanori Omote, Kanagawa; Kazuo Watanabe; Hitoshi Honda, both of Tokyo, all of Japan

[73] Assignee: Sony Corporation, Tokyo, Japan

[21] Appl. No.: 540,948

[22] Filed: Oct. 11, 1995

[30] Foreign Application Priority Data

Oct. 28, 1994 [JP] Japan ................................... 6-264948

[51] Int. Cl.⁶ ............................................... G06F 15/18
[52] U.S. Cl. ............................ 395/22; 395/23; 395/24
[58] Field of Search ............................... 395/23, 22, 24

[56] References Cited

U.S. PATENT DOCUMENTS

| | | | |
|---|---|---|---|
| 5,408,588 | 4/1995 | Ulug | 395/23 |
| 5,517,597 | 5/1996 | Aparicio, IV et al. | 395/23 |
| 5,517,667 | 5/1996 | Wang | 395/23 |
| 5,528,729 | 6/1996 | Watanabe | 395/23 |

OTHER PUBLICATIONS

Shridhar, M. and Badreldin, A. "Feature evaluation and sub–class determination through functional mapping" published in Pattern Recognition Letters, May 1985, Netherlands, vol. 3, No. 3, pp. 155–159.

Tseng, Chea–Tin (Tim) and Moret, Bernard M.E. "A New Method for One–Dimensional Linear Feature Transformations" published in Pattern Recognition, Jan. 1990, Great Britain, vol. 23, No. 7, pp. 745–752.

Siedlecki, Wojciech; Siedlecka, Kinga and Sklansky, Jack "An Overview of Mapping Techniques for Exploratory Pattern Analysis" published in Pattern Recognition, 1988, Great Britain, vol. 21, No. 5, pp. 411–429.

Reber, William L. and Lyman, John "An Artificial Neural System Design for Rotation and Scale Invariant Pattern Recognition" IEEE First International Conference on Neural Networks, Jun. 21–24, 1987, San Diego, California, pp. IV–277–IV–283.

Laine, Andrew F. and Schuler, Sergio "Hexagonal Wavelet Representations for Recognizing Complex Annotations." Proceedings of the Computer Society Conference on Computer Vision A Pattern Recognition, Seattle, Jun. 21–23, 1994, Institute of Electrical and Electronics Engineers, pp. 740–745.

B.E. Rosen, et al., "Transcendental Functions in Backward Error Propagation," 1990 Int'l. Conf. on Systems, Man, and Cybernetics, pp. 239–241, Nov. 1990.

(List continued on next page.)

*Primary Examiner*—Robert W. Downs
*Attorney, Agent, or Firm*—Limbach & Limbach L.L.P.

[57] ABSTRACT

A mapping determination method for obtaining mapping F from an N-dimensional metric vector space $\Omega_N$ to an M-dimensional metric vector space $\Omega_M$ has the following steps to get the optimal mapping quickly and positively. In the first step, complete, periodic, $L_m$ basic functions $g_m(X)$ according to the distribution of samples classified into Q categories on the N-dimensional metric vector space $\Omega_N$ are set. In the second step, a function $f_m(X)$ indicating the m-th component of the mapping F is expressed with the linear sum of the functions $g_m(X)$ and $L_m$ coefficients $c_m$. The third step provides Q teacher vectors $T_q=(t_{q,1}, t_{q,2}, t_{q,3}, \ldots, t_{q,M})$ (where $q=1, 2, \ldots, Q$) for the categories on the M-dimensional metric vector space $\Omega_M$, calculates the specified estimation function J, and obtains the coefficients $c_m$ which minimize the estimation function J. In the fourth step, the coefficients $c_m$ obtained in the third step are stored in memory.

4 Claims, 5 Drawing Sheets

OTHER PUBLICATIONS

Y. Shin and J. Ghosh, "Approximation of Multivariate Functions Using Ridge Polynomial Networks," 1992 Int'l. Conf. on Neural Networks, vol. 2, pp. II-380 to II-385. Jun. 1992.

D.H. Rao and M.M. Gupta, "Dynamic Neural Units and Function Approximation," 1993 Int'l. Conf. on Neural Networks, pp. 743-748. Mar. 1993.

C.-H. Chang, et al., "Polynomial and Standard Higher Order Neural Network," 1993 Int'l. Conf. on Neural Networks, pp. 989-994. Mar. 1993.

MAPPING DETERMINATION METHODS AND DATA DISCRIMINATION METHODS USING THE SAME

BACKGROUND OF THE INVENTION

1. Field of the Invention

The present invention relates to mapping determination methods required in various fields, such as pattern recognition, pattern generation, control systems for industrial robots, and prediction processing systems for economic problems and, more particularly, to a mapping determination system for implementing the desired mapping effectively and efficiently with the required precision and with an estimation function being minimized when the features of the mapping are determined by learning.

2. Description of the Related Art

In many fields, such as pattern recognition including voice recognition and image recognition, pattern generation including voice generation and computer graphics, prediction processing systems for economic prediction and stock-price prediction, and control systems for industrial robots, processing systems having mapping which generates or outputs output vectors in a specified dimension from input vectors in a specified dimension are used.

In voice recognition and image recognition, for example, linear mapping or nonlinear mapping is used for compressing characteristic vectors obtained from input data in digital signal processing.

Orthogonal transformations such as discrete Fourier transformation (DFT) are linear mathematical transformations. A logarithmic transformation is a nonlinear mathematical transformation. Since these mappings are fixed, however, they are hardly applied to a system in which the desired output vectors are obtained from any input vectors.

Therefore, methods for determining the desired mapping by learning has been examined. Typical examples of this kind of mapping are the KL transformation (linear) and a hierarchy neural network (nonlinear). More particularly, the hierarchy neural network has been applied to many fields because it can theoretically express any continuous mapping by increasing the number of intermediate layers.

Figure 1:
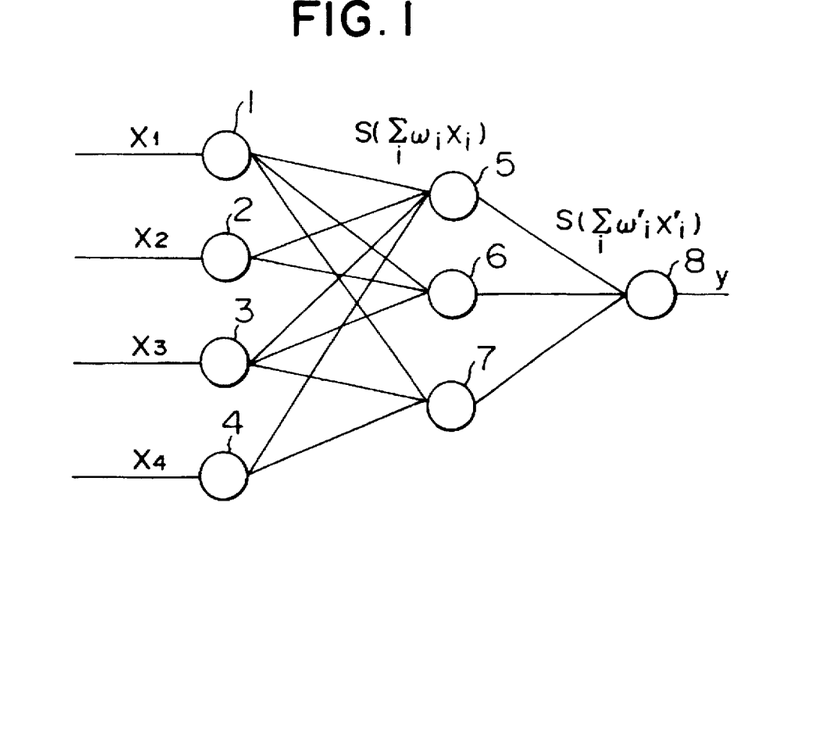
FIG. 1 illustrates a configuration example of a neural network.

This hierarchy neural network is a network in which connections are made from the input layer to the output layer such that the outputs of basic units (neuron elements) of each layer are connected to the inputs of basic units of the next layer. FIG. 1 shows an example of such a hierarchy neural network. In this example, the neural network includes three layers. The input layer has four elements (elements 1 to 4), the intermediate layer has three elements (elements 5 to 7), and the output layer has one element (element 8).

Processing performed in a general three-layer neural network having N elements in the input layer, L elements in the intermediate layer, and M elements in the output layer will be described below. Assume that an input vector X input to the input layer is expressed as $X=(x_1, x_2, x_3, \ldots, x_N)$ output vector Y output from the corresponding output layer is expressed as $Y=(y_1, y_2, y_3, \ldots, y_M)$.

The outputs from the N elements in the input layer are simply the inputs $x_i(i=1, 2, 3, \ldots, N)$ to the elements, and they are input to the L elements in the intermediate layer. The intermediate layer performs the following calculation and outputs the results. $\omega_{ij}$ indicates combination weight coefficients and $s(x)$ is a sigmoid function.

$$x'_j = S\left( \sum_{i=1}^{N} x_i \omega_{ij} \right) \quad 1$$

where,
j=1, 2, . . . . . L
$X_N \omega_{Nj} = \omega_{Nj}$

The outputs $x'_j (j=1, 2, 3, \ldots, L)$ from the L elements in the intermediate layer are input to the M elements in the output layer. The output layer performs the following calculation.

$$y_k = S\left( \sum_{j=1}^{L} x_j \omega'_{kj} \right) \quad 2$$

where,
k=1, 2, . . . . M
$X'_L \omega'_{kL} = \omega'_{kL}$

A neural network having four or more layers basically has the same network structure except for increases in the number of layers depending on an input-output relationship.

In a neural network, mapping is restricted to this kind of structure. In order to set the features of the mapping (to set combination weight coefficients ω), learning samples are given to the input layer and the outputs of the mapping (the neural network) corresponding to the learning samples are obtained. Then, teacher vectors are given corresponding to these mapping outputs, an estimation function is specified as the sum of square errors between the mapping outputs and the teacher vectors, and the combination weight coefficients ω) are determined by back propagation. The algorithm of this back propagation is a steepest descent method (probability descent method) for each data applied to a neural network.

In the steepest descent method, the result generally depends on how initial values are given to an estimation function, depending on the type of the estimation function. A solution corresponding to a minimal (local minimum) value may be obtained instead of the optimal solution corresponding to the minimum (global minimum) value.

The estimation function in the neural network exactly falls in this case. It is not assured that the solution obtained in back propagation has the minimum error. This means that depending on given initial values mapping may be obtained with outputs quite different from the teacher vectors.

Therefore, in order to obtain the best possible quasi-optimal solution, measures are taken such as a method in which learning is repeated with random numbers given as initial numbers.

It is not assured, however, that the optimal solution (the minimum value) will be theoretically obtained with these symptomatic treatments. Quasi-optimal solutions may have larger errors compared with the minimum error of the optimal solution. It takes a huge amount of learning time to get even such quasi-optimal solutions.

In addition, only when the number of neuron elements in an intermediate layer is indefinite, namely, in a ideal condition, can the neural network express any continuous mapping. In reality, the desired mapping is configured with an intermediate layer having the definite given number of neuron elements. In other words, the performance of a neural network is the extent to which an ideal mapping is approximated when the number of elements in an intermediate layer is limited to a number in actual use.

The degrees of structural freedom in a neural network comprise the number of hierarchial layers and the number of elements, both of which affect the size of the network, as well as combination weight coefficients. Therefore, a neural network may have insufficient approximation capability under the limited size in an actual use.

As described above, a neural network serving as a conventional learning-type mapping apparatus has the following three problems in learning.

(1) A minimum error is not assured for solutions. Solutions may be locally minimum values.

(2) A great amount of learning time is required to obtain a solution as close as possible to the optimal solution.

(3) A neural network may have insufficient approximation capability for the desired mapping in relation to the size in actual use.

SUMMARY OF THE INVENTION

Under these conditions, the present invention is made in order to get the optimal solution quickly and positively and to obtain mapping having higher approximation capability.

Accordingly, it is an object of the present invention to provide a mapping determination method especially suitable for periodic mapping, wherein the desired mapping is given under the condition that the estimation function is minimized and a great amount of learning time is not required to determine the mapping.

The above object of the present invention is achieved through the provision of a mapping determination method for obtaining mapping F from an N-dimensional metric vector space $\Omega_N$ to an M-dimensional metric vector space $\Omega_M$, comprising: a first step of setting complete, periodic, $L_m$ basic functions $g_m(X)$ according to the distribution of samples classified into Q categories on the N-th dimensional metric vector space $\Omega_N$; a second step of expressing a function $f_m(X)$ indicating the m-th component of the mapping F with the linear sum of the function $g_m(X)$ and $L_m$ coefficients $c_m$; a third step of providing Q teacher vectors $T_q = (t_{q,1}, t_{q,2}, t_{q,3}, \ldots, t_{q,M})$ (where q=1, 2, ..., Q) for the categories on the M-dimensional metric vector space $\Omega_M$, calculating the specified estimation function J, and obtaining the coefficients $c_m$ which minimize the estimation function J; and a fourth step of storing the coefficients $c_m$ obtained in the third step.

The estimation function J may be expressed as follows, where $E\{X \in S_q\} \times \{f(X)\}$ indicates a calculation for obtaining the expected values of the function $f(X)$ over all elements in a learning sample $S_q$.

$$J = \sum_{q=1}^{Q} E\{X \in Sq\} \times \left\{ \sum_{m=1}^{M} (f_m(X) - t_{q,m})^2 \right\}$$

The coefficients $c_m$ which minimize the estimation function J may be obtained by partially differentiating the estimation function J by the coefficients $c_m$, and setting the result to 0 in the third step.

The basic functions $g_m(X)$ may be trigonometric functions.

The above object of the present invention is also achieved through the provision of a data discrimination method for discriminating input-data categories using the mapping function obtained from the above-described mapping determination method.

DETAILED DESCRIPTION OF THE PREFERRED EMBODIMENTS

In the present invention, a function $f_m(X)$ for the m-th component of mapping F is defined as follows with linear combination of $L_m$ functions $g_{m,1}(X)$ when the mapping F from an N-dimensional metric vector space $\Omega_M$ to an M-dimensional metric vector space $\Omega_M$ is determined.

$$f_m(X) = c_m^T g_m(X) \qquad 3$$

where, $X \in \Omega_N$, $c_m = |c_{m,1}, c_{m,2}, \ldots, c_{m,Lm}|^T$, $g_m(X) = |g_{m,1}(X), g_{m,2}(X), \ldots, g_{m,Lm}(X)|^T$, T: inversion $X = (x_1, x_2, x_3, \ldots, x_n)$, $c_m$: Specified coefficients.

That is, a complete function system on an N-variable function space is employed as the function $g_{m,1}(x)$ in the present invention. From a theorem in function analysis that says any function can be expressed with linear combination of complete function systems, it is understood that any continuous mapping can be theoretically expressed with the functions $g_{m,1}(x)$ when the number $L_m$ is large enough. This corresponds to the condition that any continuous mapping can be theoretically expressed when the number of neuron elements in the intermediate layer of a hierarchy neural network is large enough.

Figure 2:
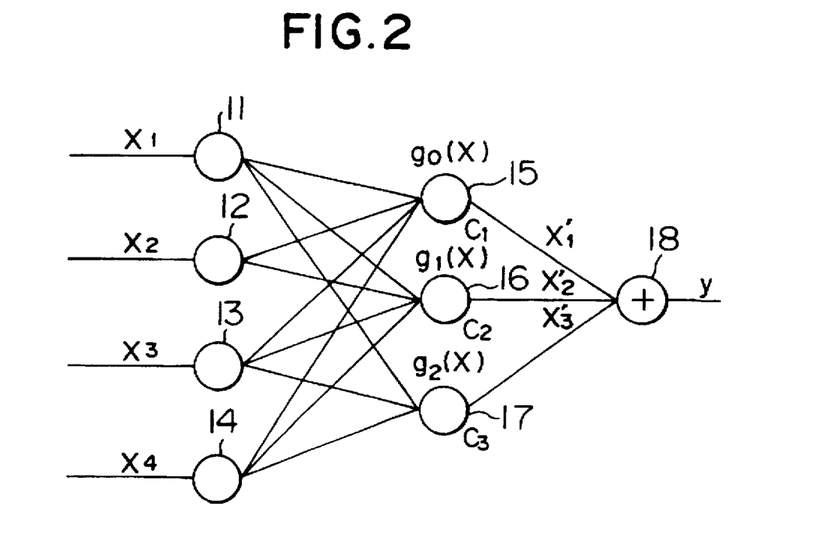
FIG. 2 shows a configuration of a network using a mapping determination method of the present invention.

For comparison with the neural network shown in FIG. 1, a network according to mapping of the present invention is illustrated in FIG. 2. Inputs $x_1$ to $x_4$ are input to elements 11 to 14, then are output to elements 15 to 17 in the intermediate layer as is. The element 15 performs the calculation shown by the following expression.

$$X'_1 = c_1 g_1(X) \qquad 4$$

The function $g_1(X)$ (=$g_1(x_1, x_2, x_3, x_4)$) is calculated from the variables $x_1, x_2, x_3,$ and $x_4$. Then coefficient $c_1$ is multiplied. In the same way, the elements 16 and 17 perform the calculations shown by the following expressions.

$$X'_2 = c_2 g_2(X) \qquad 5$$

$$X'_3 = c_3 g_3(X) \qquad 6$$

The element 18 in the output layer calculates the sum of $x'_1, x'_2,$ and $x'_3$ output from the elements 15 to 17 to obtain the output y.

When the functions $g_i(X)$ are selected or set to the specific functions, mapping F is obtained by setting coefficients $c_i$ to the specific values in learning.

In other words, the functions $g_i(X)$ are selected such that the pattern structure to be analyzed is more clearly identified. When a pattern is distributed on three classes (categories) in one dimension, the three classes cannot be identified with functions 1 and X. It is necessary to add a term of the second or subsequent order $X^i$ ($i>1$) to the functions $g_i(X)$.

To determine the coefficients $C_i$, learning samples (set of the learning samples on categories $C_q$: $S_q$(=($S_{q1}$, $S_{q2}$, ..., $S_{qN}$)) classified into Q categories $C_q$ (q=1, 2, 3, ..., Q) on an N-dimensional (metric) vector space $\Omega_N$ are used together with Q teacher vectors $T_q$ (=($t_{q,1}$, $t_{q,2}$, $t_{q,3}$, ..., $t_{q,M}$), where q=1, 2, ..., Q) on an M-dimensional (metric) vector space $\Omega_N$ against the categories $C_q$ to calculate the estimation function J expressed by the following expression. It is preferred that the teacher vectors be at general positions. This means that $t_{q,1} t_{q,2}, t_{q,2} t_{q,3}, \ldots, t_{q,M-1} t_{q,M}$ are linearly independent.

$$J = \sum_{q=1}^{Q} E\{X \in Sq\} \left[ \sum_{m=1}^{M} (f_m(X) - t_{q,m})^2 \right] \quad 7$$

Let $E\{x \in S_q\}[\ ]$ mean calculation of expected values (averages) over $S_q$ within $|\ |$. Coefficient vector $c_m$ is determined in advance such that this estimation function is minimized. The desired mapping can be performed against input vectors by calculating $f_m(x)$ specified in the expression 3 with the use of the obtained coefficient vector $c_m$.

Based on the Hibert's famous theorem in function analysis that says any function can be expressed with linear combination of complete function systems, any continuous mapping can be theoretically expressed by employing complete function systems in an n-variable function space as the basic functions $g_{m,i}(x)$ and making the number $L_m$ large enough.

How to obtain coefficient vector $c_m$ which makes the estimation function, described in the expression 7, minimum will be described below. From the expression 7, the following expression can be obtained.

$$J = \sum_{m=1}^{M} \left\{ \sum_{q=1}^{Q} E\{X \in Sq\}[(f_m(X) - t_{q,m})^2] \right\} \quad 8$$

The expression 8 can be expressed as follows;

$$J = \sum_{m=1}^{M} J_m \quad 9$$

$$J_m = \sum_{q=1}^{Q} E\{X \in Sq\}[(f_m(X) - t_{q,m})^2] \quad 10$$

The expression 3 is substituted into the expression 10 to get the following expression.

$$\begin{aligned} J_m &= \sum_{q=1}^{Q} E\{X \in Sq\}[(C_m^T g_m(X) - t_{q,m})^2] \\ &= \sum_{q=1}^{Q} E\{X \in Sq\}[C_m^T g_m(X) g_m^T(X) C_m - \\ & \quad C_m^T g_m(X) t_{q,m} - t_{q,m} g_m^T(X) C_m + (t_{q,m})^2] \\ &= C_m^T \left\{ \sum_{q=1}^{Q} E\{X \in Sq\}[g_m(X) g_m^T(X)] \right\} C_m - \\ & \quad C_m^T \left\{ \sum_{q=1}^{Q} E\{X \in Sq\}[g_m(X)] t_{q,m} \right\} \\ & \quad - \left\{ \sum_{q=1}^{Q} t_{q,m} E\{X \in Sq\}[g_m^T(X)] \right\} C_m + \sum_{q=1}^{Q} (t_{q,m})^2 \\ &= c_m^T G_m c_m - c_m^T H_m - H_m^T c_m + K_m \end{aligned} \quad 11$$

$G_M$ is an $L_m$-by-$L_m$ symmetrical matrix, $H_M$ is an $L_m$-order vector, and $K_M$ is a constant, obtained from learning samples and teacher vectors. The expression 11 is substituted into the expression 9 to get the following expression.

$$J = \sum_{m=1}^{M} \{c_m^T G_m c_m - c_m^T H_m - H_m^T c_m + K_m\} \quad 12$$

The necessary and sufficient condition for $c_m$ to minimize the expression 12 is as follows;

$$\partial J / \partial c_m = 0 (m=1, 2, \ldots, M) \quad 13$$

From this expression, the following expression is obtained.

$$G_m c_m - H_m = 0 (m=1, 2, \ldots, M) \quad 14$$

By solving this equation for $c_m$, the coefficient vector $c_m$ is determined. The coefficient $c_m$ for minimizing the estimation function J is obtained by solving the equation 14.

As described above, when mapping according to the present invention is determined, minimizing the estimation function is assured except for special cases such as when the equation 14 is indeterminate or inconsistent. This means, instead of solving the equation 14, applying the steepest descent method to the estimation function J, shown in the expression 12, also generates the solution $c_m$ uniquely without being annoyed by the initial-value problem.

This feature, that a unique solution is obtained, eliminates repeated learning for obtaining a quasi-optimal solution in a neural network with an initial value being changed.

Assume that the mapping shown in the expression 3 uses a periodic function ($f(x)=f(x+\theta)$, $\theta$: period), especially a trigonometric function, for the basic function. That is, the mapping in which the m-th order function is expressed by the expression 15 is used. Any periodic function is approximated by a periodic function with fewer terms than, for example, a monomial expression with N variables.

$$f_m(x) = a_m + b_m^T r_m(x) + c_m^T r_m(x) \quad 15$$

where $a_m$, $b_m = |b_{m,1}, b_{m,2}, \ldots, b_{m,lm}|^T$, and $c_m = |c_{m,1}, c_{m,2}, \ldots, c_{m,lm}|^T$ are coefficients, 1, $g_m(x) = |g_{m,1}(x), g_{m,2}(x), \ldots, g_{m,lm}(x)|^T$, and $h_m(x) = |h_{m,1}(x), h_{m,2}(x), \ldots, h_{m,Jm}(x)|^T$ are basic functions. $g_{m,i}(x)$ and $h_{m,j}(x)$ are expressed as follows;

$$g_{m,i}(x) = \cos(p_i^T x) \ (i=1, \ldots, L_m) \quad 16$$

$$h_{m,j}(x) = \sin(q_j^T x) \ (j=1, \ldots, J_m) \quad 17$$

$p_i$ and $q_j$ are N-dimensional vectors and selected such that the following is linearly independent.

$\{1, g_{m,1}(x), g_{m,2}(x), \ldots, g_{m,lm}(x), h_{m,1}(x), h_{m,2}(x), \ldots, h_{m,Jm}(x)\}$ When $x \in \Omega_2$, that is, N=2, for example, $g_{m,i}(x)$ corresponds to $\cos X_1$, $\cos 2x_1$, $\cos 3x_1$, ..., $\cos X_2$, $\cos 2x_2$, $\cos 3x_2$, ..., $\cos(x_1+x_2)$, ... and so on. The sine function $h_{m,j}(x)$ corresponds in the same way.

The following expressions are defined to express the expression 15 in the same way as the expression 3.

$$r_m = |a_m, b_m^T, c_m^T|^T \quad 18$$

$$s_m(t) = |1\ g_m^T(x) h_m^T(x)|^T \quad 19$$

With the expressions 13 and 14, the expression 3 can be expressed as follows;

$$f_m(x) = r_m^T s_m(x) \quad 20$$

By defining the estimation function J as the expression 7, $r_m$ which minimizes J can be obtained in the same way as for $c_m$.

$$\partial J/\partial r_m = 0 (m=1, 2, \ldots, M) \qquad 21$$

From this expression, the following equation is obtained.

$$G_m r_m - H_m = 0 \ (m=1, 2, \ldots, M) \qquad 22$$

$G_m$ and $H_m$ are coefficients obtained from the following expressions.

$$G_m = \sum_{q=1}^{Q} E\{X \epsilon Sq\} \begin{bmatrix} 1 & g_m{}^T(X) & h_m{}^T(X) \\ g_m(X) & g_m g_m{}^T(X) & g_m(X) h_m{}^T(X) \\ h_m(X) & h_m g_m{}^T(X) & h_m(X) h_m{}^T(X) \end{bmatrix} \qquad 23$$

$$H_m = \sum_{q=1}^{Q} t_{q,m} E\{X \epsilon Sq\} \begin{bmatrix} 1 \\ g_m(X) \\ h_m(X) \end{bmatrix} \qquad 24$$

Mapping F which minimizes the estimation function J is obtained by solving the equation 22 to get $r_m$. Being suitable for minimizing the estimation function J, this mapping is superior in terms of using a less number of terms in approximating a periodic mapping with the use of trigonometric functions as the basic functions.

Figure 3:
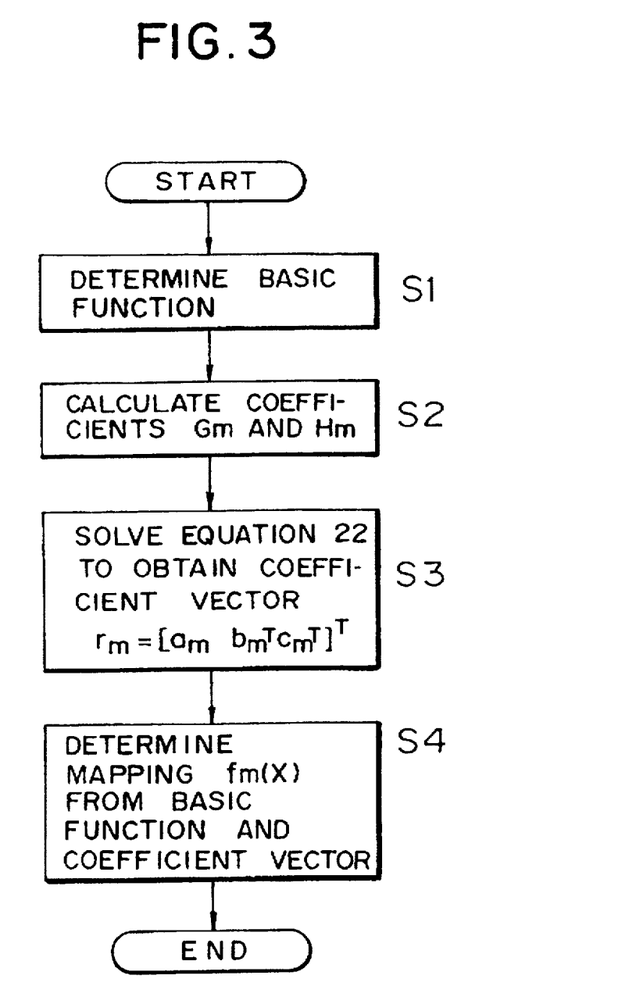
FIG. 3 is a flowchart indicating the processes of the mapping determination method of the present invention.

FIG. 3 shows the above-described process. A basic function vector $s_m(X)$ using trigonometric functions is determined according to the expression 19 in a step S1. Coefficients $G_m$ and $H_m$ are obtained from learning data and teacher vectors according to the expressions 23 and 24 in a step S2. Then in a step S3, a coefficient vector $r_m$ is obtained by solving the expression 22. Next in a step S4, mapping $f_m(x)$ is obtained from the basic function vector and the coefficient vector according to the expression 20.

As the basic function, a cosine function only, a sine function only or combinations of polynomials and trigonometric functions may be used.

Figure 4:
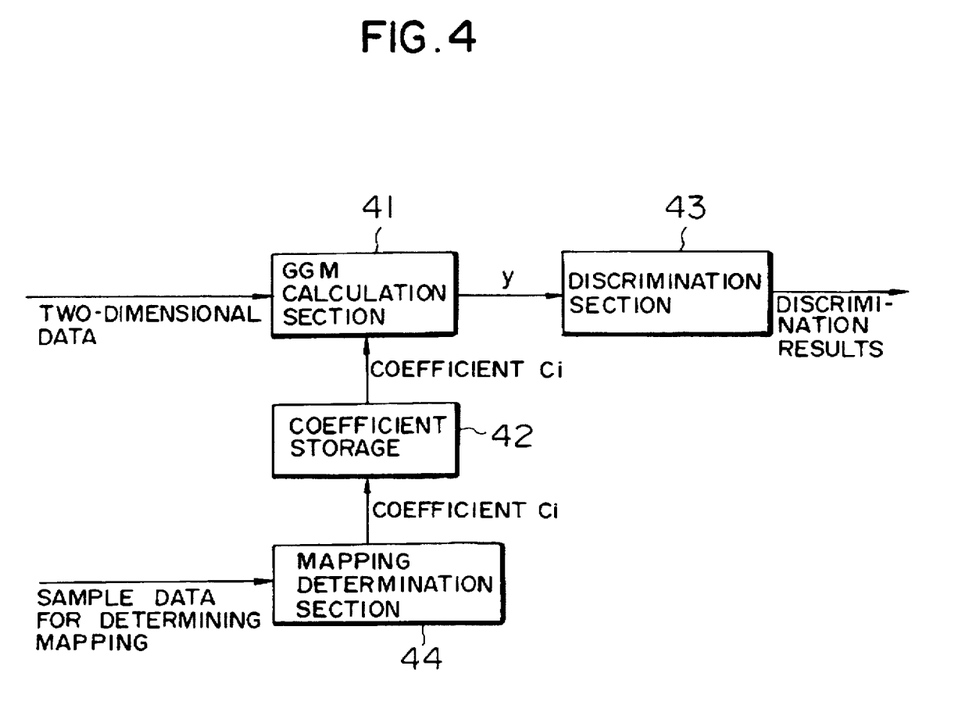
FIG. 4 is a block diagram showing a configuration example of a discrimination apparatus to which the mapping determination method of the present invention is applied.

An example will be described below in which the above-described mapping determination method is applied to a discrimination apparatus for classifying two-dimensional data into two categories. FIG. 4 shows the category discrimination apparatus. Sample data for determining mapping is supplied to a mapping determination section 44. It may be two-dimensional data to be input to a guaranteed global minimum mapping (GGM) calculation section 41. The mapping determination section 44 determines mapping coefficients $c_i$ using the mapping determination method described above. The determined coefficients $c_i$ are stored in a coefficient storage 42. The two-dimensional data is input to the GGM calculation section 41, and calculation is performed to obtain the function $f_m(x)$ of mapping F. Referring to the coefficients $c_i$, stored in the coefficient storage 42, if necessary, the GGM calculation section 41 performs the specified calculation. The output y of the GGM calculation section 41 is sent to a discrimination section 43 for the specified discrimination. This apparatus corresponds to a system having a two-dimensional input space (N=2), one-dimensional output space (M=1), and two categories (Q=2, that is $C_1$ and $C_2$). The configuration of the discrimination apparatus will be described below in a case in which two-dimensional learning data ($x_1$ and $x_2$) are given for two categories and $T_1=1$ and $T_2=0$ are given as teacher vectors (scalar) for the categories $C_1$ and $C_2$.

Figure 5:
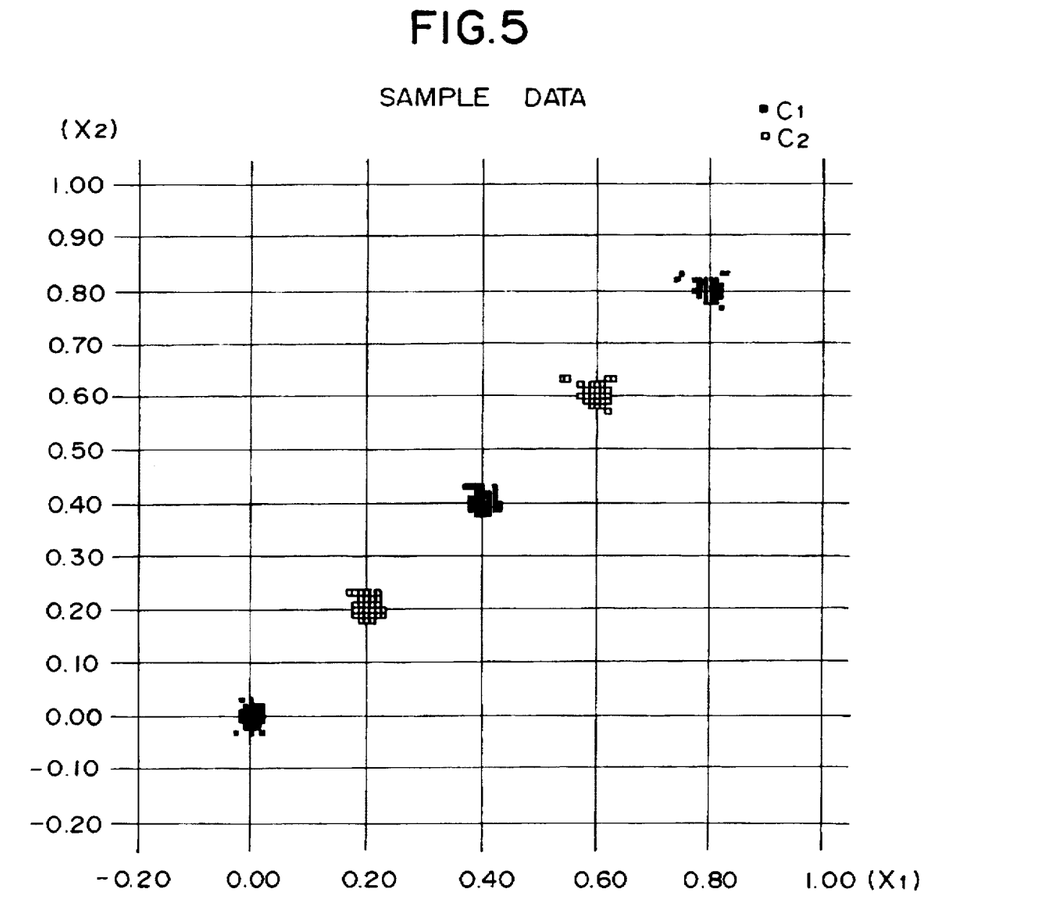
FIG. 5 indicates two-dimensional learning data in categories $C_1$ and $C_2$.

Assume that two-dimensional data ($x_1$ and $x_2$) shown in FIG. 5 is given. In this example, the learning data for the category $C_1$ exists around points (0.0, 0.0), (0.4, 0.4), and (0.8, 0.8). The learning data for the category $C_2$ exists around points (0.2, 0.2) and (0.6, 0.6). They are indicated by black points and white points, respectively. The number of $C_1$ data points is 156 and that of $C_2$ data points is 105, both including some points in common. This learning data seems to appear periodically. The mapping is determined by using the following 29 functions as the basic functions in $f_m(x)$, shown in the expression 3.

1, $\cos X_1$, $\cos X_2$, $\cos 2x_1$, $\cos 2x_2$, $\cos(x_1+x_2)$, $\cos 3x_1$, $\cos 3x_2$, $\cos(2x_1+x_2)$, $\cos(x_1+2X_2)$, $\cos 4x_1$, $\cos 4X_2$, $\cos(3x_1+X_2)$, $\cos(2x_1+2x_2)$, $\cos(x_1+3x_2)$, $\sin X_1$, $\sin X_2$, $\sin 2x_1$, $\sin 2x_2$, $\sin(x_1+x_2)$, $\sin 3x_1$, $\sin 3x_2$, $\sin(2x_1+x_2)$, $\sin(x_1+2x_2)$, $\sin 4x_1$, $\sin 4X_2$, $\sin(3x_1+x_2)$, $\sin(2x_1+2x_2)$, $\sin(x_1+3x_2)$ $g_m(x)$ and $h_m(x)$ are expressed with these sine functions and cosine functions. $G_m$ and $H_m$, shown in the expressions 23 and 24, are calculated for these basic functions. In other words, the expected values $E\{x \epsilon S_1\}|\ |$ in the expression 23 are obtained for the learning data in the category $C_1$, and the expected values $E\{x \epsilon S_2\}|\ |$ in the expression 23 are obtained for the learning data in the category $C_2$. The sum of these expected values is $G_m$.

In the same way, the expected values $E\{x \epsilon S_1\}|\ |$ in the expression 24 are obtained for the learning data in the category $C_1$, and the expected values $E\{x \epsilon S_2\}|\ |$ in the expression 24 are obtained for the learning data in the category $C_2$. The sum of products with the teacher vectors $T_1=1$ and $T_2=0$ is calculated as $H_m$. Then, the equation 22 is solved with the obtained coefficients $G_m$ and $H_m$ to get the coefficient vector $r_m=[a_m b_m{}^T C_m{}^T]^T$. With this coefficient vector and the basic functions, the mapping (expression 15) is determined. Table 1 shows the coefficients actually obtained for the learning data shown in FIG. 5, corresponding to the basic functions.

TABLE 1

Basic Functions and Corresponding Coefficients

| No. | Basic function | Coefficient |
| --- | --- | --- |
| 1 | 1 | 28.355072 |
| 2 | $\cos x_1$ | −10.587779 |
| 3 | $\cos x_2$ | −4.354881 |
| 4 | $\cos 2x_1$ | −37.078199 |
| 5 | $\cos 2x_2$ | −8.762493 |
| 6 | $\cos (x_1 + x_2)$ | −20.528007 |
| 7 | $\cos 3X_1$ | −3.716895 |
| 8 | $\cos 3X_2$ | −0.696277 |
| 9 | $\cos (2X_1 + X_2)$ | 13.326908 |
| 10 | $\cos (X_1 + 2X_2)$ | 5.626294 |
| 11 | $\cos 4X_1$ | −0.782561 |
| 12 | $\cos 4X_2$ | 6.456909 |
| 13 | $\cos (3X_1 + X_2)$ | 5.723860 |
| 14 | $\cos (2X_1 + 2X_2)$ | 5.728928 |
| 15 | $\cos (X_1 + 3X_2)$ | −6.622603 |
| 16 | $\sin x_1$ | 8.519443 |
| 17 | $\sin x_2$ | −0.534107 |
| 18 | $\sin 2x_1$ | −3.635216 |
| 19 | $\sin 2x_2$ | 3.856045 |
| 20 | $\sin (x_1 + x_2)$ | 5.956769 |
| 21 | $\sin 3x_1$ | −0.886165 |
| 22 | $\sin 3x_2$ | −13.770971 |
| 23 | $\sin (2x_1 + x_2)$ | 12.679578 |
| 24 | $\sin (x_1 + 2x_2)$ | −2.730276 |
| 25 | $\sin 4x_1$ | 4.526975 |
| 26 | $\sin 4x_2$ | −3.533694 |
| 27 | $\sin (3x_1 + x_2)$ | −17.697961 |
| 28 | $\sin (2x_1 + 2x_2)$ | 11.321379 |
| 29 | $\sin (x_1 + 3x_2)$ | 1.625174 |

Figure 6:
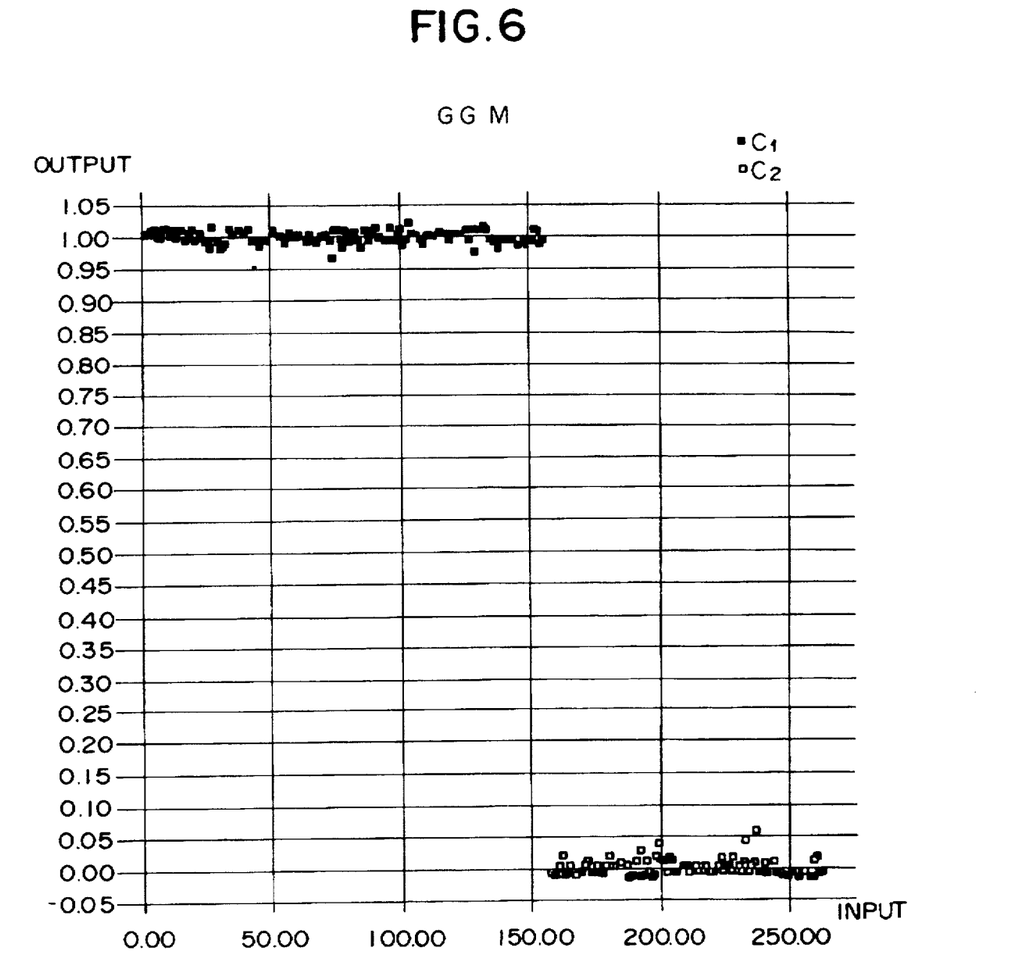
FIG. 6 indicates the outputs of the mapping to which the learning data is input.

FIG. 6 shows the outputs of a discrimination apparatus using the obtained mapping. The outputs for the data inputs in the category $C_1$ are black points whereas those of the data inputs in the category $C_2$ are white points. The horizontal axis indicates data numbers and the vertical axis indicates the outputs of the mapping for the corresponding data. The $C_1$ data is mapped around $T_1=1$ and the $C_2$ data is mapped around $T_2=0$, indicating that this discrimination apparatus effectively works for classifying the input data into the categories.

As described above, with the use of learning data in each category in an input vector space and teacher vectors in each category in an output space, mapping can be configured with linear combination of basic functions, especially using trigonometric functions as basic functions, such that the estimation function (expression 7) is minimized.

It is needless to say that the above-described method which uses trigonometric functions as the basic functions can be applied to create the desired mapping from $\Omega_N$ to $\Omega_M$ even when given learning data is periodic as in the above example. When an input vector space is limited to a finite space on $\Omega_N$ and learning data is periodic, this method is especially effective.

When data obtained in observation for a certain period is used for prediction at a future time as in a prediction processing system, if the observed data is periodic, a prediction processing system can be implemented for data other than the observed data, that is, future data, by configuring mapping having trigonometric functions described above as the basic functions with the observed data being used as learning data.

In addition, with the use of the present invention, the precision in pattern recognition can be increased, providing a highly precise pattern recognition apparatus.

According to the present invention, since trigonometric functions are used as the basic functions, minimization of an estimation function is assured and quick learning is enabled because repeated learning is not required. Mapping effective to periodic inputs can be implemented.

What is claimed is:

1. A mapping determination method for obtaining a mapping F from an N-dimensional metric vector space $\Omega_N$ to an M-dimensional metric vector space $\Omega_M$, comprising the steps of:

a first step of setting $L_m$ complete, periodic basic functions $g_{m,i}(X)$, where i is an integer in the range from 1 through $L_m$, according to a distribution of samples classified into Q categories on said N-dimensional metric vector space $\Omega_N$;

a second step of expressing functions $f_m(X)$, where m=1, 2, . . . , N, each indicating the m-th component of said mapping F as a linear sum determined by said functions $g_{m,i}(X)$ and a set of $L_m$ coefficients $c_m$;

a third step of providing Q teacher vectors $T_q=(t_{q,1}, t_{q,2}, t_{q,3}, \ldots t_{q,M})$ (where q=1, 2, . . . , Q) for said categories on said M-dimensional metric vector space $\Omega_M$, calculating an estimation function J specified by the functions $f_m(X)$, said teacher vectors, and said distribution of samples, and determining values of said coefficients $c_m$ which minimize said estimation function J; and a fourth step of storing into memory said values of said coefficients $c_m$ obtained in the third step, wherein said estimation function J is expressed as follows, where $E\{X \in S_q\} \times \{f(X)\}$ indicates a calculation for obtaining expected values of said functions $f_m(X)$ over all elements in learning samples $S_q$:

$$J = \sum_{q=1}^{Q} E\{X \in S_q\} \times \left\{ \sum_{m=1}^{M} (f_m(X) - t_{q,m})^2 \right\}.$$

wherein said values of the coefficients $c_m$ which minimize said estimation function J are obtained by partially differentiating said estimation function J by said coefficients $c_m$, and setting the result to 0 in the third step, and wherein the third step further comprises the steps of:

calculating $$G_m = \sum_{q=1}^{Q} E\{X \in S_q\} \times \{g_m(X) \times g_m^T(X)\};$$

calculating $$H_m = \sum_{q=1}^{Q} t_{q,m} \times E\{X \in S_q\} \times \{g_m(X)\};$$

and obtaining said values of said coefficients $c_m$ from $G_m \times c_m - H_m = 0$.

2. The mapping determination method of claim 1, wherein said basic functions $g_{m,i}(X)$ comprise trigonometric functions and polynomial functions.

3. A mapping determination apparatus for obtaining a mapping F from an N-dimensional metric vector space $\Omega_N$ to an M-dimensional metric vector space $\Omega_M$, comprising:

first means for setting $L_m$ complete, periodic basic functions $g_{m,i}(X)$, where i is an integer in the range from 1 through $L_m$ according to a distribution of samples classified into Q categories on said N-dimensional metric vector space $\Omega_N$;

second means for expressing functions $f_m(X)$, where m=1, 2, . . . , N, each indicating the m-th component of said mapping F as a linear sum determined by said functions $g_{m,i}(X)$ and a set of $L_m$ coefficients $c_m$;

third means for providing Q teacher vectors $T_1=(t_{1,1}, t_{q,2}, t_{q,3}, \ldots t_{q,M}$(where q=1, 2, . . . , Q) for said categories on said M-dimensional metric vector space $\Omega_M$, calculating an estimation function J specified by the functions $f_m(X)$, said teacher vectors, and said distribution of samples, and determining values of said coefficients $c_m$ which minimize said estimation function J; and fourth means for storing into memory said coefficients cm obtained by the third means, wherein said estimation function J is expressed as follows, where $E\{X \in S_q\}$ X $\{f(X)\}$ indicates a calculation for obtaining expected values of said functions $f_m(X)$ over all elements in learning samples $S_q$:

$$J = \sum_{q=1}^{Q} E\{X \in S_q\} \times \left\{ \sum_{m=1}^{M} (f_m(X) - t_{q,m})^2 \right\},$$

and wherein the third means further comprises:

means for calculating $$G_m = \sum_{q=1}^{Q} E\{X \in S_q\} \times \{g_m(X) \times g_m^T(X)\};$$

means for calculating $$H_m = \sum_{q=1}^{Q} t_{q,m} \times E\{X \in S_q\} \times \{g_m(X)\};$$

and means for obtaining said values of said coefficients $c_m$ from $G_m \times c_m - H_m = 0$.

4. A data discrimination method for classifying input N-dimensional metric vectors into plural categories specified in advance, comprising the steps of:

a first step of receiving said N-dimensional metric vectors; a second step of reading coefficients $c_m$ stored in memory, said coefficients $c_m$ being determined by a method comprising the steps of:

a first calculation step of setting $L_m$ complete, periodic, basic functions $g_{m,i}(X)$, where $i=1, \ldots, L_m$, according to a distribution of samples on said N-dimensional metric vector space $\Omega N$ a second calculation step of expressing functions $f_m(X)$, where $m=1, \ldots, N$, each indicating the m-th component of said mapping F as a linear sum determined by said functions $g_{m,i}(X)$ and a set of $L_m$ coefficients $c_m$;

a third calculation step of providing Q teacher vectors $T_q = (t_{q,1}, t_{q,2}, t_{q,e}, \ldots, t_{q,M})$ (where $q=1, 2, \ldots, Q$) on an M-dimensional metric vector space $\Omega M$, calculating a specified estimation function J, and obtaining values of coefficients $c_m$ which minimize said estimation function J; and a fourth calculation step of storing into memory said values of said coefficients $c_m$ obtained in the third calculation step;

a step of obtaining said values of said functions $f_m(X)$, each indicating the m-th component of said mapping F from said values of said coefficients $c_m$ and said functions $g_{m,i}(X)$; and a step of classifying said N-dimensional metric vectors into said plural categories specified in advance from the calculation results obtained by substituting said N-dimensional metric vectors into said values of said functions $f_m(X)$ wherein said estimation function J is expressed as follows, where $E\{X \in S_q\} \times \{f(X)\}$ indicates a calculation for obtaining expected values of said functions $f_m(X)$ over all elements in learning samples $S_q$;

$$J = \sum_{q=1}^{Q} E\{X \in S_q\} \times \left\{ \sum_{m=1}^{M} (f_m(X) - t_{q,m})^2 \right\},$$

wherein said values of said coefficients $c_m$ which minimize said estimation function J are obtained by partially differentiating said estimation function J by said coefficients $c_m$, and setting the result to 0 in the third calculation step, and wherein the third calculation step further comprises the steps of:

calculating $$G_m = \sum_{q=1}^{Q} E\{X \in S_q\} \times \{g_m(X) \times g_m^T(X)\};$$

calculating $$H_m = \sum_{q=1}^{Q} t_{q,m} \times E\{X \in S_q\} \times \{g_m(X)\};$$

and obtaining said values of said coefficients $c_m$ from $G_m \times c_m - H_m = 0$.

* * * * *